Figure 1:
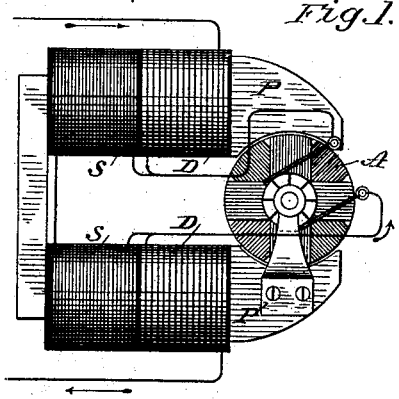

(No Model.)

E. THOMSON.
ELECTRIC MOTOR.

No. 373,108. Patented Nov. 15, 1887.

Witnesses:
Ernest Abshagen
Thos. Toomey

Inventor:
Elihu Thomson
By his Attorney

UNITED STATES PATENT OFFICE.

ELIHU THOMSON, OF LYNN, MASSACHUSETTS, ASSIGNOR TO THE THOMSON-HOUSTON ELECTRIC COMPANY, OF CONNECTICUT.

ELECTRIC MOTOR.

SPECIFICATION forming part of Letters Patent No. 373,108, dated November 15, 1887.

Application filed January 15, 1885. Serial No. 152,949. (No model.)

*To all whom it may concern:*

Be it known that I, ELIHU THOMSON, a citizen of the United States, and a resident of Lynn, in the county of Essex and State of Massachusetts, have invented certain new and useful Improvements in Electric Motors, of which the following is a specification.

My invention relates to the construction and operation of electric motors, and its object is to compensate for changes of load and consequent changes of speed by devices which shall act to keep the speed from becoming too high by cutting down the strength of the field whenever there is a tendency to increase of speed.

My invention consists in applying to the field-magnet of the motor any suitable means or devices that shall have the effect of counteracting or cutting down the strength of the magnetic field, and in controlling the action of such device through any of the effects consequent upon or manifested through an increase in the speed of rotation of the armature upon a diminution in the load. To this end I may utilize either the increased counter electro-motive tendency of the armature when rotating at an increased speed or may employ the mechanical effects of increased speed of rotation as manifested through the agency of a speed governor or indicator operating through centrifugal action, or I may employ the two combined. The means for counteracting or cutting down the field-magnetism is preferably a coil wound or connected so as to oppose the effects of the main or charging coil in the field-magnet. Such coil may convey a depolarizing or demagnetizing current from any desired source, the flow of current in the coil being controlled or governed, preferably, by an artificial or variable resistance, or by a circuit-controller in turn controlled by the action of a speed-governor responsive to changes in the speed of the armature, or by the counter electro-motive influence of the armature on an increase of speed. The counteracting-coil may be arranged or connected in any desired manner; but I prefer to place it in a derived or branch circuit around the armature, as the counter electro-motive tendency on an increase of speed may be then utilized directly in increasing the action or influence of the coil by forcing more current through it, while with such action or operation may be combined or not, as desired, the action due to the operation of a circuit-controller or artificial resistance governed, as just specified, by the mechanical effects of an increase of speed or by the increased counter electro-motive tendency of the armature.

Some of the ways in which my invention may be carried out in practice are shown in the accompanying drawings, in which—

Figure 2:
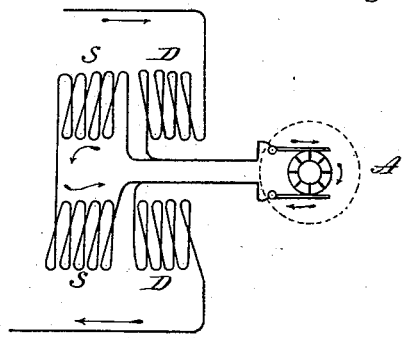
Figure 3:
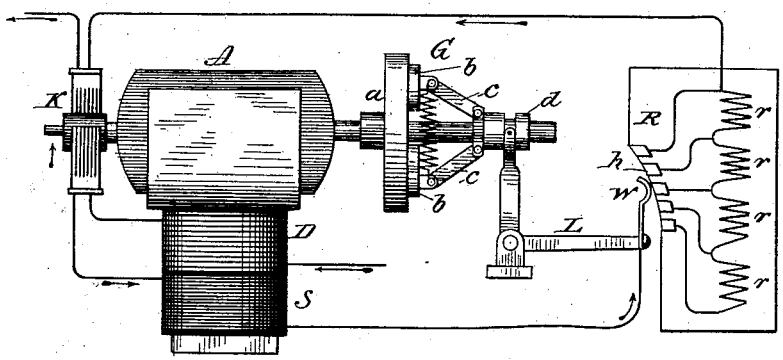
Figure 4:
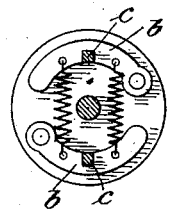
Figure 5:
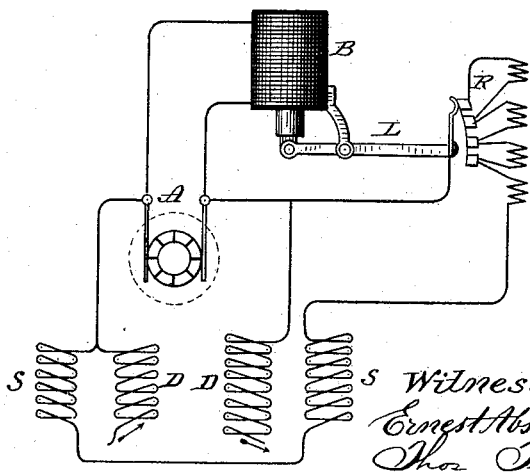
Figure 6:
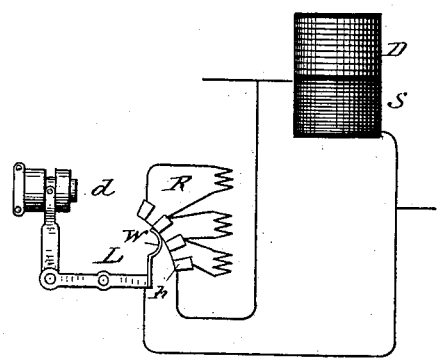

Figure 1 is an elevation of an electric motor having a counteracting or depolarizing coil applied in accordance with my invention. Fig. 2 is a diagram of the circuits. Fig. 3 is a diagram illustrating the manner of combining a controlling artificial resistance or switch with the depolarizing-coil, such switch or adjustable resistance being governed by a centrifugal speed-indicator responsive to changes in the speed of the armature. Fig. 4 is an elevation of a portion of the speed governor or indicator. Fig. 5 shows how the counter electro-motive tendency may be utilized in the same manner as the mechanical effects consequent upon an increase of speed. Fig. 6 illustrates an equivalent arrangement of the switch or artificial variable resistance with relation to the depolarizing-coil.

In Fig. 1, A indicates the armature of an electric motor, and P P' the poles of the field-magnet. D D indicate the charging-coils upon such magnet, which coils are constantly in circuit with any source of electricity (preferably a constant-current source) and afford the magnetic power for influencing the armature A, which latter is preferably, as shown, on the same circuit or in a branch around any portion of the circuit. The coils S S, applied to the field-magnet, are the demagnetizing, counteracting, or depolarizing coils. They are so wound or connected that when current flows in them they oppose the effects of the coils D D, and when they are connected to and derive their current from the main circuit they are preferably of high resistance. The general principles of my invention do not, however, depend upon the resistance of these coils, and their size and resistance are to be determined by the particular conditions of use, as is well understood by electricians.

In Fig. 1 and in the diagram the coils S S are shown as placed in a derived circuit or branch around the armature A. The effect of this arrangement is as follows: Any increase of speed of the armature due to diminished load causes an increase of counter electro-motive force in such armature, and this results, obviously, in forcing more current to flow in the coils S S, forming a branch around the armature A, than flowed before the diminution of load took place. Said coils therefore tend proportionately to oppose the influence of the coils D D in producing the magnetic field, and thus compensate to a greater or less extent for the diminution in load.

A more sensitive arrangement, and one by which the results may be effected with less variation of speed, is indicated in Fig. 3. In this figure I show how the mechanical effects of an increase of speed in the armature, as manifested by a centrifugal governor or indicator, may be utilized in effecting compensation by increasing the depolarizing or counteracting effect of the coils S. The latter are here shown in derived circuit around the armature, so that the influence of increased counter electro-motive force is utilized, as well as that of the adjustment of resistance or of a circuit-controller, effected, as here shown, through the action of the centrifugal governor. I do not, however, limit myself to the particular disposition of the coils S shown in this figure, as they might be arranged or combined with any suitable source of electricity, so that the influence of increased counter electro-motive force would not be felt in them.

The centrifugal governor G is of any desired type. That shown consists of a disk, $a$, secured to the armature-shaft and carrying the pivoted arms $b$ $b$, which move outward by centrifugal action and through links $c$ $c$ move the sleeve $d$ longitudinally upon the shaft or an extension thereof. The lever L receives motion from the longitudinal movement by resting in a circumferential groove in the sleeve and actuates or controls the switch or adjusting devices of the variable resistance which controls the flow of current in the coils S.

A variable resistance adjusted by the action of the lever L is indicated at R. The sections of the resistance or rheostat are indicated at $r$ $r$ $r$ $r$, and are connected to a series of insulated contacts, $h$, in the usual way, so that by the movement of a circuit-closing switch or spring, W, over them more or less of the resistance will be included in circuit. This artificial resistance is placed in the direct circuit with the coils S, through the switch or spring W, as indicated. Upon an increase of speed the centrifugal governor moves the lever L in a direction to decrease the amount of resistance in the rheostat or artificial resistance W, so that more current will be permitted to flow through the coils S in circuit with said resistance, thus increasing the counteracting or demagnetizing action of the latter.

In the arrangement of the coils S described the increased counter electro-motive force developed in the armature adds its effects by forcing more current into the branch containing coils G. Upon diminished speed the lever L is moved, so as to produce an opposite effect or a weakening of the current in coils S.

It is obvious that the artificial resistance and switch might be in a shunt or branch around the coils S, as indicated in Fig. 6, so as to produce the same effect; but in such arrangement the connections must be such that the movement of the lever L, on an increase of speed of the motor-armature, will increase the resistance in W, thus forcing more current to flow in coils S, so as to cut down the strength of the motor-magnet.

In Fig. 5 I illustrate an arrangement that may be employed when it is desired to make the increased counter electro-motive force developed in the armature effect an adjustment of the artificial resistance, which determines the flow of current in the coils S. The electro-magnet B is in a derived circuit around the armature, as indicated, and has its core or armature connected to the switch or adjusting-lever L. The electro-magnet B responds by virtue of the increased current forced into it by the increased counter electro-motive force developed in the armature on decrease of load and increase of speed, and lifts its core, so as to move the lever L and set or adjust the resistance to cause an increased flow of current in the coils S S and so lower the power of the field-magnets.

Upon low speed the counter-electro-motive force of A falls, less current is diverted through B, and the lever L is depressed by the core of B, or by a retractor, so as to set the resistance in a way to diminish the effect of coils S by diminishing the current flowing through them.

I do not limit myself to details of construction in the magnets, switches, resistances, speed indicators or governors, &c., my invention consisting in the broad combinations claimed.

What I claim as my invention is—

1. The combination, with an electric motor, of a device acting on the field-magnet with a tendency opposing the main or field magnetism and with a power dependent upon the speed of the motor as determined by the load to gradually and directly vary the magnetic field in which the armature revolves, as and for the purpose described.

2. In an electric motor, a field-magnet having two sets of coils, one a charging set and the other a demagnetizing or opposing set, having a constant or approximately-constant effect while the motor is running at any given speed.

3. In an electric motor, a field-magnet having two sets of coils, one of which is a demagnetizing set in a derived circuit around the motor-armature and has a constant or approximately-constant effect while the motor is running at any given speed.

4. In an electric motor, the combination, with the main or energizing field-magnet coils, of a set of coils opposing the influence of the energizing-coil and arranged in multiple-arc circuit with the armature, and an adjustable artificial resistance controlling the flow of current in said opposing coils.

5. The combination, with an electric motor, of a demagnetizing coil or helix, a variable artificial resistance controlling the flow of current in said coil, and a centrifugal governor for operating or adjusting said resistance correspondingly with the change of speed in the armature.

6. The combination, with the field-magnet for an electric motor, of an automatic controlling device actuated by variations in the speed of rotation of the motor under varying loads to automatically vary the strength of the magnetic field in which the armature revolves independently of the strength of the main-circuit current supplied to the motor-terminals.

Signed at Lynn, in the county of Essex and State of Massachusetts, this 3d day of January, A. D. 1885.

ELIHU THOMSON.

Witnesses:
E. J. RICHARDS,
E. W. RICE, Jr.